SATURABLE SWITCH
Filed March 31, 1953 3 Sheets-Sheet 1
Fig. 1
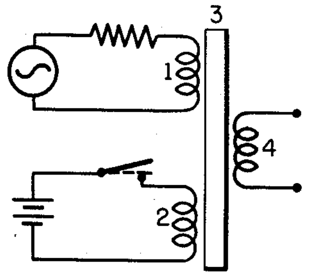
Fig. 2
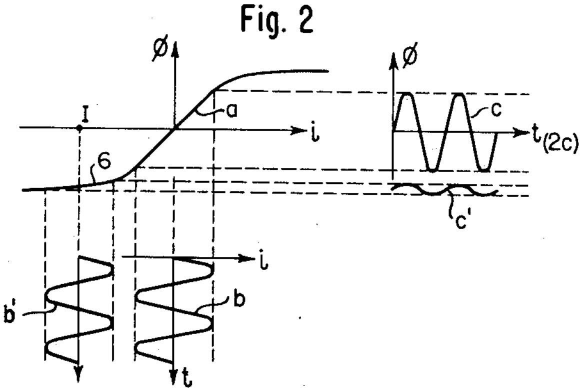
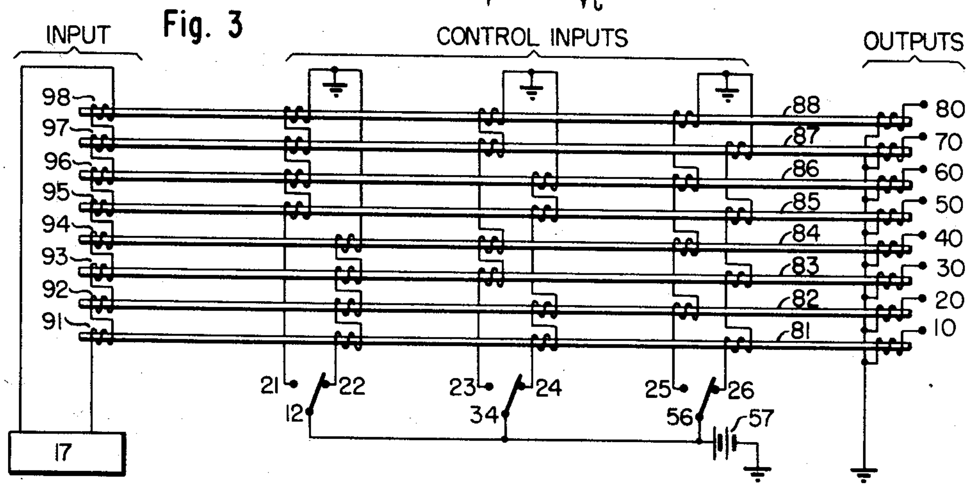
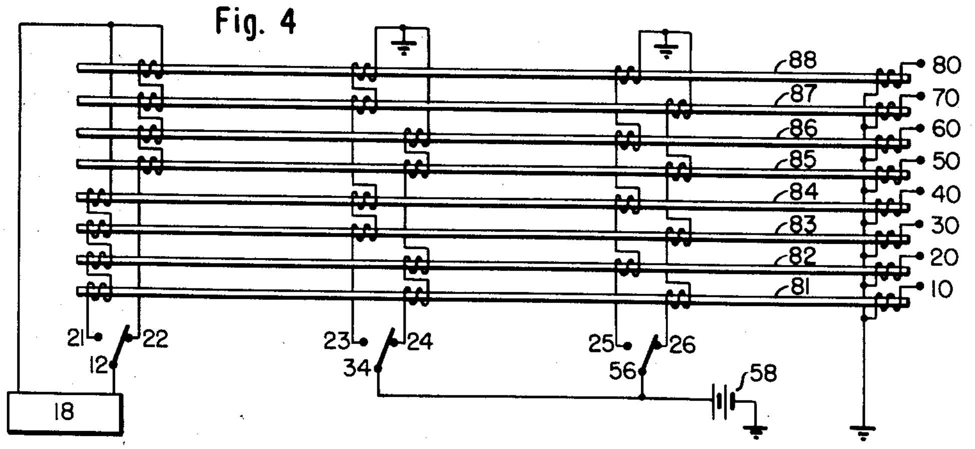
INVENTORS
KENNETH H. OLSEN
BY Kenway, Jenney, Witter + Hildreth
ATTORNEYS INVENTORS
KENNETH H. OLSEN
BY Kenway, Jenney, Witter & Hildreth
ATTORNEYS INVENTORS
KENNETH H. OLSEN
BY Kenway, Jenney, Witter + Hildreth
ATTORNEYS United States Patent Office
2,937,285
Patented May 17, 1960

2,937,285

SATURABLE SWITCH

Kenneth H. Olsen, Cambridge, Mass., assignor to Research Corporation, New York, N.Y., a corporation of New York Application March 31, 1953, Serial No. 345,766
22 Claims. (Cl. 307—88)

The present invention relates to a switch for controlling the passage of electrical energy involving the use of saturable transmissive elements each controlled by a unique combination of coordinated control leads.

This switch has the property of certain mechanical relay systems which are particularly well adapted to decoding and which allow the use of a relatively small number of control leads to select among a large number of output terminals. However, because it has no moving mechanical parts the present invention is capable of much faster switching operation than that which could be achieved by a mechanical system. While certain circuits involving the use of a relatively large number of crystal diodes also have the above property of allowing a small number of leads to select among many terminals, they are handicapped by the fact that the crystal diode cannot itself handle a large current and is a relatively delicate element; furthermore, its high impedance characteristics prevent the handling of short voltage pulses.

It is therefore an object of this invention to provide a simple and precise all-electric means for rapidly switching among a large number of terminals.

It is a further object of this invention to produce a switch combining the voltage conversion properties of a transformer with the switching advantages of a coordinate matrix whereby $nA$ control leads are capable of selecting between $A^n$ output terminals, where A is a chosen base number, preferably 2.

In furtherance of these and other objects, a principal feature of the present invention is the use of saturable electrically transmissive elements connected in coordinate groupings in such a way that at any given time all of the elements except the one through which transmission is desired are biased to cut-off by one or more control inputs.

Another feature is the use of saturable magnetic elements to form a switch-transformer whose impedance matching properties permit a number of voltage or current values to be obtained from a single signal source. Still another feature is the use of saturable dielectric materials on a sheet of which the switch elements can be printed. One embodiment of the device permits it to function as a decoder using fewer elements than the usual relay tree circuits or similar systems. Another embodiment of the device is a single-digit binary adder whose non-mechanical structure provides a speed of operation suitable for the most rapid digital computers. These and other features will appear from the accompanying drawings.

Figure 1 illustrates a typical saturable magnetic switching element.

Figure 2 illustrates the flux diagrams of such an element.

Figure 3 illustrates a basic version of the switch.

Figure 4 illustrates a modified version of the switch in which one of the control leads also functions as an input-output lead.

Figure 7:
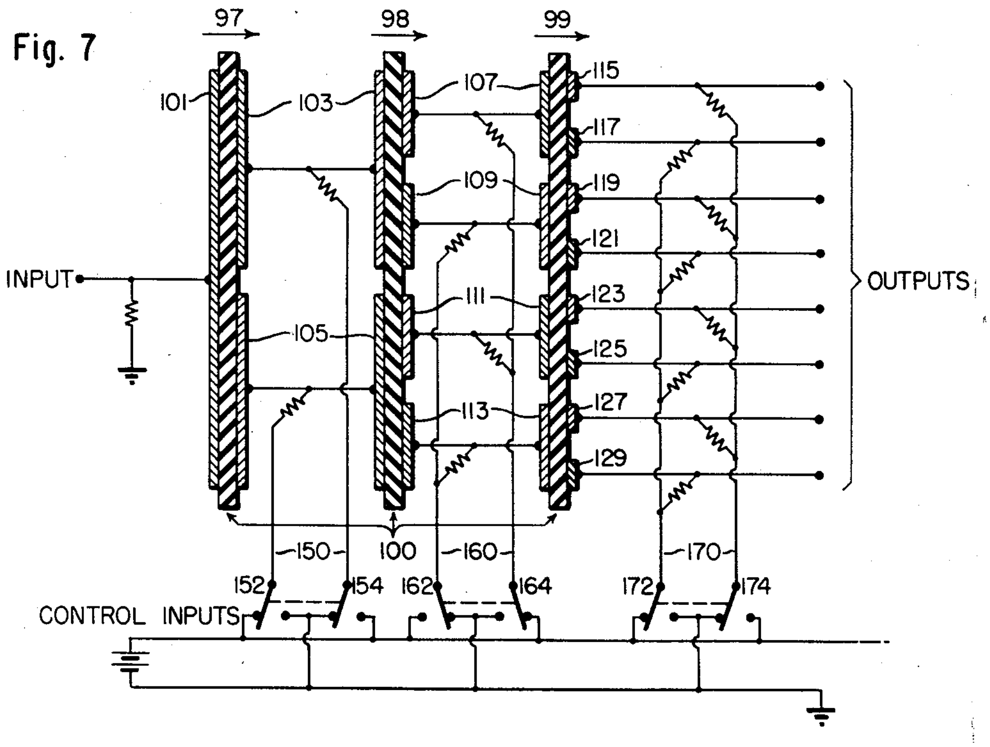
Figure 7 shows a switch using areas of non-linear dielectric for the saturable elements.
Figure 8:
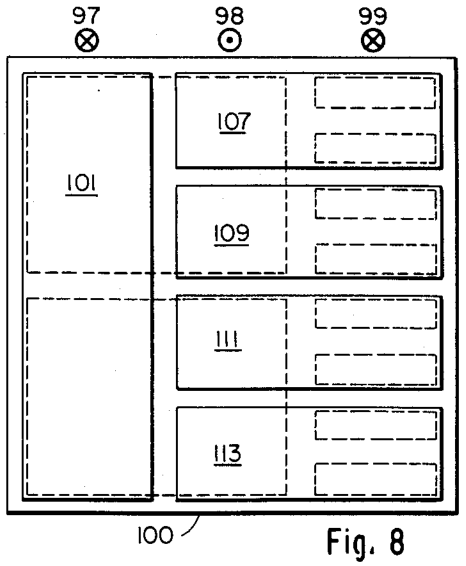
Figure 8A:
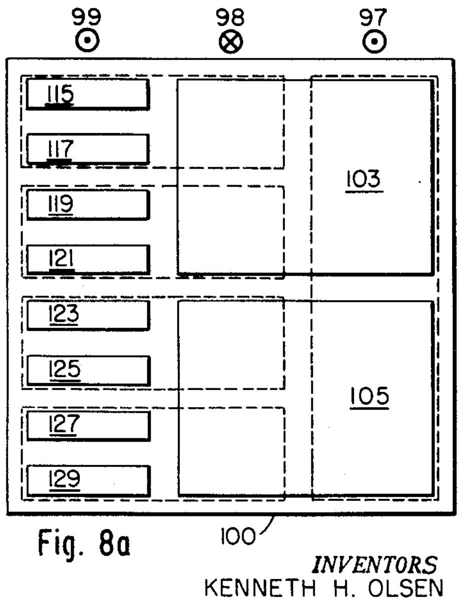

Figures 8 and 8*a* show a printed capacitor suitable for use in the circuit of Figure 7.

The principle of operation of the switch will appear from a brief consideration of a magnetic bar such as that shown in Figure 1 and having properties similar to those which are illustrated in Figure 2. In Figure 1 is shown a magnetic bar 3 capable of acting as a transformer core and carrying three sets of windings, numbered 1, 2, and 4. Winding 1 functions as a driving winding and is shown as connected to a source of alternating current. Winding 2 functions as a control winding, the control being effected by a direct current flowing through this lead. Winding 4 functions in the same way as the secondary of any transformer to detect changes in the flux of the core and produce an output which depends on changes in that flux. This element shown in Figure 1 operates as a saturable transformer in that when no direct current is flowing through winding 2 the alternating current power from the source 1 is transferred with only small losses to the output 4, as in a conventional transformer. However, when a direct current is passing through the control winding 2 little or no power is transferred from the input to the output.

Although the general principles of operation of a core excited by both alternating and direct current are known, they will be briefly outlined here, in conjunction with Figure 2 showing at *a* a curve similar to a conventional magnetization curve, with flux ($\varphi$) plotted against current ($i$). The diagram is simplified in that is shows no hysteresis loop. If an alternating current is then passed through the power winding 1 the direction and intensity of the input current will be shown by the sine wave *b* of Figure 2 and the flux as a function of time will be shown at *c*. If, however, the switch to the control winding 2 is closed and a direct current is allowed to pass through the winding, the condition of the magnetic element will be about point 6, on the saturation part of the characteristic, and if a sine wave $b'$ is fed into the winding 1, the flux will vary only slightly, as shown at $c'$. As is illustrated in 2*c* the change in the flux with time is very small. Since there is little or no change in the flux there will be little or no voltage induced in the output winding 4 of Figure 1.

While the power source here has been referred to as an alternating current source and the operation has been described in terms of A.C. power it is apparent that a pulse of current in either direction will be transmitted by the element in its unbiased state as is represented by *b—c,* while a voltage pulse, if applied to the element in its saturated state, will induce only a negligible amount of change in the flux and hence of output.

It will be seen that the operation of the switching element is that of a saturable transformer and while the operation has been described in terms of an equal number of windings on the input and output leads it is possible to make use of the impedance matching characteristics of a transformer to achieve any desired ratio in current or voltage between the input and output leads. Furthermore, it is possible to use any electrically transmissive element which has a saturating input-to-output characteristic like that shown in Figure 2.

One embodiment of the invention consists of a switch made of a number of the above-described magnetic elements and controlled in the above manner through a coordinate switching arrangement which is described below for the binary case. The basic switching circuit is shown in Figure 3. It consists of eight ($2^3$) magnetic bars or transformer elements as shown and numbered 81 through 88. Each element has one separate set of windings numbered 10, 20, 30, 40, 50, 60, 70 or 80, depending on the element with which it is connected. All of the elements have in common a series of windings from a generator or driver 17 each consisting of one or more turns around each of the elements in series. Ignoring for a moment the control windings and considering the switch as consisting only of the cores 81–88, each with an individual winding (10, 20, 30, etc.) and having also the driving windings 91–98 in common, it will be seen that if an alternating current is delivered by the driver 17 it will drive all of the cores simultaneously and an output could be detected in each of the separate output coils 10, 20, 30, etc.

In order to have this device function as a switch (or commutator), the invention selectively allows transmission through any individual magnetic element while at the same time preventing transmission through the remaining elements. This is done by a series of control windings each of which is capable of preventing transmission through those cores to which it leads. In Figure 3 these control windings are arranged in three stages denoted by the numbers 12, 34 and 56. At each stage there is a double-throw selector switch or the equivalent which is capable of choosing one of the two control leads and each of these control leads in turn is capable of biasing half of the number of elements involved in the switch.

Stage 12 selects between control leads 21 and 22. Control lead 22 biases elements 81 through 84, while control 21 biases elements 85 through 88. Stage 34 selects between controls 23 and 24. Control lead 24 biases elements 81, 82, 85 and 86, while control 23 biases elements 83, 84, 87, and 88. Stage 56 switches between control leads 25 and 26. Lead 26 biases 81, 83, 85 and 87, while lead 25 biases 82, 84, 86 and 88.

To illustrate the operation of this control system, assume that transmission through element 88 is desired. It is necessary that no current flow through control leads 21, 23 and 25 in order to achieve this result and therefore stages 12, 34 and 56 are switched to leads 22, 24, and 26, respectively. An examination of all the elements other than element 88 will show that the above switching arrangement results in at least one biasing current controlling each of these elements. If 17 generates a driving signal, this signal will results in a change of state of flux of element 88 only and therefore only at terminal 80 will there be an output sensed. (Conversely, for the driver 17 a detector may be substituted, and it will sense as an output only the input at terminal 80.)

In a like manner there is a unique combination of switching positions for the selector switches at 12, 34 and 56 which will permit transmission of a signal through any one of the elements while at the same time preventing transmission through all of the others. For example, to permit transmission through element 81 all of the switches will be reversed and current would be allowed to pass through control leads 21, 23 and 25.

A more general examination of the theory of the binary controlling matrix will show that each stage reduces the number of possible channels for a signal to one-half of the number selected by the previous stage. For example, where transmission through element 81 is desired, stage 12 is switched to lead 21 and thus permits transmission through elements 81 through 84 at stage 34. The biasing current through lead 23 at the next stage blocks transmission through elements 83 and 84 and therefore permits transmission only through elements 81 and 82. At stage 56 as between elements 81 and 82 passing a biasing current through lead 25 results in transmission of a signal through element 81 only.

This geometric arrangement which reduces the possible number of channels in half at each stage is related to the tree type of circuit commonly used with mechanical relays or other similar devices. A fundamental difference, however, is the fact that tree circuits require at each stage a number of elements corresponding to the number of channels involved. In the above arrangement, however, only one element is necessary for each channel, each element having a unique grouping of a relatively small number of control windings.

A general way of expressing the performance of such a switch is to say that it enables $nA$ control leads to select between $A^n$ channels. It is apparent that the advantages of using such a device increase greatly where large numbers of channels are involved. For example five toggle switches selecting between ten control leads can switch between thirty-two channels. In the preferred form, as shown, binary coding is used (i.e. $A=2$).

Frequently the stages which have been illustrated as those controlled by the selector switches will in practice be controlled by bi-stable circuits which permit current to be drawn by either one of two channels depending upon which stable state it is in. This control means is particularly useful when a switch of this type is used with high speed binary digital computing equipment.

It should be noted that this device is a relatively efficient means of controlling power because only the selected core changes its state. Since there is little or no change in the flux of the unselected cores, there is a negligible power loss from hysteresis effects in the elements other than the one chosen. Furthermore, variation in the number of turns of the input and output windings may be used to obtain varying degrees of voltage or current change between input and output.

One of the most useful applications for this device, however, depends not upon its properties as a switch or commutator but rather on its properties as a decoding device. Any given switching combination of stages 12, 34 and 56 will select one of the eight output terminals. This characteristic is particularly useful with typewriters using punched tape where the tape may be punched either for lead 21 or 22 and at the same time for 23 or 24 and for 25 or 26. This sort of binary coding may be applied not only to typewriters where characters of the alphabet are chosen from a code master tape, but generally to any sort of coding. Used in this manner the switch replaces tree type arrangements of relays or similar devices, involves many fewer elements, and attains greater speed. In the computing field this application may be used to convert directly from binary to arithmetic numbers.

Thus, if switch 56 represents the $2^0$ column of binary numbers, switch 34 the $2^1$ column, and 12 the $2^2$ column, and terminals 21, 23 and 25 represent zeros, and terminals 22, 24 and 26 represent ones, then each setting of the toggles represents one of the binary numbers from 000 to 111, and the output coil so selected represents its decimal equivalent from 0 to 7, coil 10 being 0, coil 20 being 1, etc. (It can readily be seen how the addition of another column of control coils would permit conversion of binary numbers from 0000 to 1111 to their decimal equivalents from 0 to 16.)

The switch has been discussed in the form shown in Figure 3 because it is believed that this arrangement most easily illustrates the theory of operation. However, a simplified form shown in Figure 4 is believed to be preferable for many purposes. It will be seen that Figure 4 is identical with Figure 3 except for the fact that the common source shown as 17 in Figure 3 has been eliminated and another source 18 is shown as leading direct to stage 12, whereby either the upper four coils or the lower four may be excited from the source 8, depending on the position of the switch 12. While the use of the biasing current is limited to stages 34 and 56 the theory of operation is the same as that already described in that each stage permits transmission through one-half the element and blocks transmission through the other half. However, in this case stage 12, the windings of which have taken over the input and output functions of the common source 17 in Figure 3, operates by simply not choosing those elements through which transmission is not desired. Biasing of these elements is therefore not necessary.

To illustrate this mode of operating it will be recalled that in Figure 3 choice of lead 22 at stage 12 biased elements 81 through 84 and permitted transmission through elements 85 through 88. In Figure 4 the selection of this same lead also prevents a signal being transmitted through elements 81 through 84 since in this position these elements have no winding connected to the source. Lead 22 permits transmission through elements 85 through 88 since in this position of stage 12 these are the only elements which possess the common power (or sensing) winding.

Figure 5:
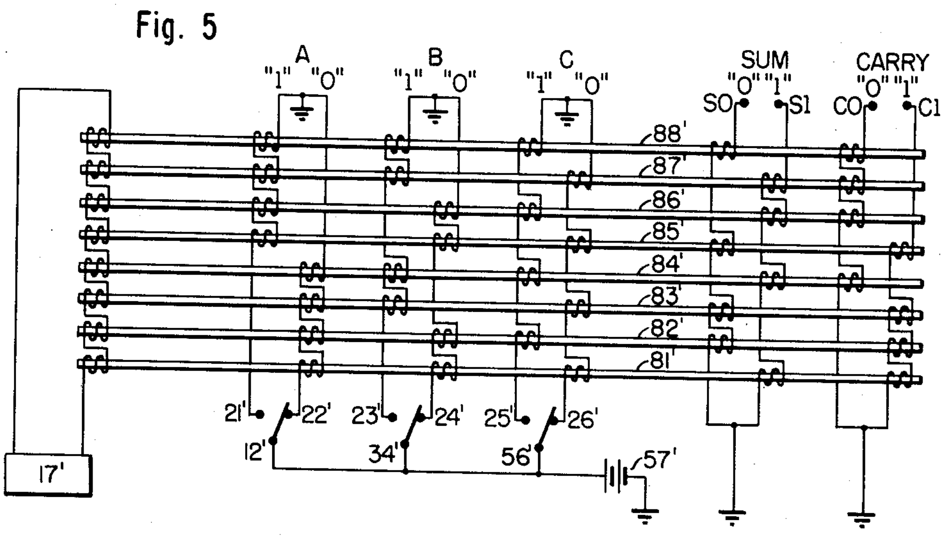
Figure 5 illustrates a second modified version of the switch suitable for use as a single-digit binary adder.

Figure 5 shows a further modification of the present invention so that it serves as a binary adder for use in digital computers. In the addition of two binary numbers, the operation on each column of figures is the addition of the two digits in the column plus the carry-over from the previous column to produce a sum-digit and a carry-over to the next column. Thus, for example:

| | | | | | | |
|---|---|---|---|---|---|---|
| Carry from preceding column | 1 | 1 | 1 | 0 | [0] | |
| A | | 1 | 0 | 1 | 1 | (11) |
| plus B | | | 1 | 1 | 0 | ( 6) |
| Sum $(A+B)$ | 1 | 0 | 0 | 0 | 1 | (17) |
| Carry to next column $(c)$ | 0 | 1 | 1 | 1 | 0 | |

In the third column, the two digits are zero and one, the carry-over is one and the result is a sum of zero and carry of one. On this basis ($A+B+C=$sum+carry), an addition table may be set up:

| Input | | | Output | |
|---|---|---|---|---|
| A | B | C | Sum | Carry |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

Figure 5 shows the modification such that by setting the two digits up on two of the control coil switches and setting the carry from the preceding column into the third control coil switch, and further, by providing two sets of output coils, one for sum-digits and one for carry-digits, a binary single-digit adder can be made.

Eight cores are provided, 81', 82', 83', 84', 85', 86', 87' and 88', one for each of the combinations in the table above. A driver 17' energizes all of the cores. Each core carries three control coils and two output coils. All of the control coils are connected to switch terminals 21', 22', 23', 24', 25' and 26', a pair of terminals for each of the switches 12', 34' and 56', in the same manner as in Figure 3. Each terminal in a pair corresponds to one of the binary digits 1 or 0, and each of the switches corresponds to one of the columns A, B or C in the table above. It has been explained already in connection with Figure 3 how energizing one of each of the pairs biases all of the cores to cut-off except one.

The output coils are connected to terminals so that the output terms of the table which are appropriate to the given A—B—C combination are selected. The coils are connected in series to a sum pair of terminals S0 and S1 and a carry pair of terminals C0 and C1. Each terminal in the pair represents a binary digit 0 or 1. Thus, if the switches (or flip-flops) 12', 34' and 56' are set so that $A=1$ (21'), $B=0$ (24'), and C, the carry from the preceding stage, =1 (25'), then, all the cores except 83' are biased to cut-off. Then, outputs appear only at terminals S0 and C1, representing a sum zero and carry one. The carry is carried by suitable connections to the switch corresponding to 56' in a later digit adder. Thus, a sequence of single-digit adders, as shown in Figure 5, can be made to add two binary numbers of any desired length.

Figure 6:
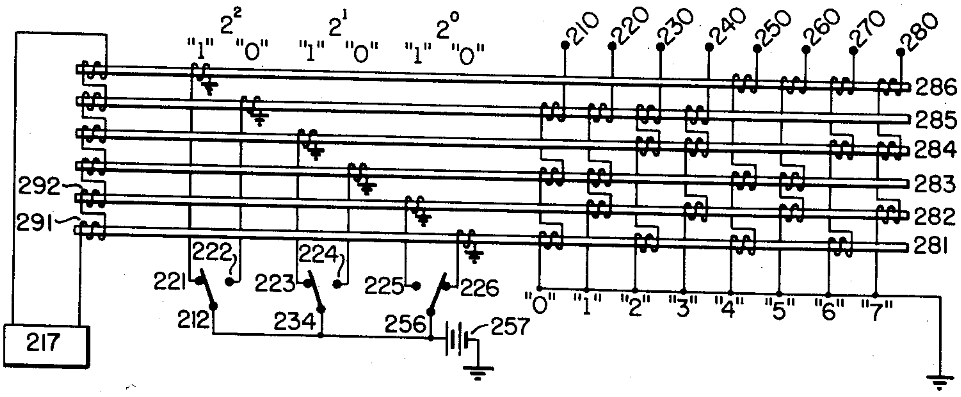
Figure 6 illustrates a third modification of the switch in which the number of elements is reduced.

Figure 6 shows a further variant of the present invention in which the number of cores is reduced from $2^n$ to $2n$. The embodiment of Figure 6 also has an advantage in that each of the control currents goes through only one winding, thus reducing the inductance associated with the switching operation and resulting in greater speed. In this system, however, the selected output terminal is one across which zero output appears.

Figure 6 shows a switching arrangement using the six cores 281, 282, 283, 284, 285 and 286 as transmissive elements. (In order to facilitate an understanding of Figure 6, reference characters similar to those of Figure 3 have been used, but prefixed by 2; thus, 281 corresponds to 81.) A driver 217 activates primary 291 to 296 coils to introduce a cyclically varying mmf. in the cores. Control coils are provided to apply to the cores the saturating mmf. obtained from the D.C. source 257. The various combinations of control coils are selected by the three switches 212, 234 and 256, each of which selects one terminal from the following pairs of terminals: 221 and 222; 223 and 224; 225 and 226. As indicated by the designation of each switch as $2^2$, $2^1$ or $2^0$, it can readily be seen that each position of the three switches represents one of the binary numbers from 000 (0) to 111 (7).

A plurality of output coils are provided on each of the cores which are interconnected to eight output terminals 210, 220, 230, 240, 250, 260, 270 and 280. Each output corresponds to a number from 0 to 7. It will be seen that the output coils are arranged the way the control coils were in Figure 3. That is, each successive bank of coils divides the coils of the preceding bank into two pairs. Thus, the coils on cores 286 and 285 divide the eight outputs into halves of four outputs each, the coils on cores 284 and 283 divide the eight outputs into quarters of two outputs each, dividing by two each of the halves set by cores 286 and 285. Finally, the last division into eights is made by the coils on cores 282 and 281.

Because of this arrangement, each position of the three control switches uniquely selects one of the output terminals at which none of the input from the driver 217 appears. Thus, for the control switch position shown (binary number 110), no output appears at terminal 270 (octal number 6). The property of the core-coil configuration is that the presence of a saturating D.C. input prevents an output from appearing; however, a coil on a saturated core can still carry signals from a coil in series with it. Thus, switch 212 activates terminal 221, cutting off core 286, but leaving core 285 unsaturated. Therefore, an output appears in all the coils on core 285 and that output voltage will appear at the output terminals connected to those cores, even if all the other cores were saturated. Therefore, none of terminals 210, 220, 230 or 240 can be the selected terminal at which no output appears.

Similarly switch 234 leaves core 283 active, which will cause outputs to appear at terminals 210, 220, 250 and 260. Switch 256 leaves core 282 active, and outputs appear at terminals 220, 240, 260 and 280. The only terminal at which no output appears is terminal 270, which corresponds to octal number 6, which, in turn, corresponds to binary number 110, represented by the switch positions. Such a switch might be used by connecting the ouputs to relays in such a way that all the relays except the one selected are held open by the outputs which appear at all but the selected output terminal.

Another important application of the invention is in the control of a binary storage system using magnetic elements, such a system as that described in the copending application of Forrester, Serial No. 225,714, filed May 11, 1951, now Patent No. 2,736,880, granted Febuary 28, 1956. The present invention permits a substantial reduction in the number of vacuum tubes or crystal diodes used to control such a memory.

Figures 7, 8, and 8*a* show a further modification of the present invention in which the saturable elements are not magnetic cores, but non-linear or ferroelectric dielectrics. Figure 7 shows a capacitor arrangement for accomplishing the same result as the magnetic arrangement shown in Figure 3. Figures 8 and 8*a* show a printed capacitor suitable for use in such a circuit. The constructions shown in Figs. 7, 8 and 8*a* are the specific invention of Dudley A. Buck and are described and claimed in a divisional application Serial No. 646,436, filed March 15, 1957.

A non-linear or ferroelectric condenser has a charge-voltage characteristic like the flux-current characteristic of the saturable magnetic core shown in Figure 2. That is, the slope of the characteristic is essentially constant over a small range near the origin where charge is proportional to voltage decreases, but as the input voltage is increased the ratio of charge to voltage decreases. Thus, a capacitor can be made whose output in response to a given input is substantially reduced by the presence of a D.C. saturating or biasing voltage. The principle of operation of the circuit of Figure 7 is therefore the same as that of Figure 3. Means are provided for applying a D.C. saturating excitation to cut off successive halves of the number of output channels. The control inputs are activated by a series of two-position switches, so arranged that a given setting of the switches uniquely selects a single output to be saturated and therefore substantially larger than the other outputs.

The operation of the circuit can be seen from an inspection of the first stage 97 of the circuit. The sheet dielectric 100 is of a non-linear material, as described above. On one face of the sheet is the condenser plate 101 and on the other side of the sheet the two plates 103 and 105. Fig. 8 shows the first stage as made up of a single dielectric sheet, but it will be apparent that separate condensers can be used by simply breaking the dielectric and plates between the plates 103 and 105 and providing a suitable electric connection across the two halves of the plate 101. The input excitation corresponding to that from the driver 17 of Figure 3 is applied to the plate 101 and the output of the stage is taken from the plates 103 and 105. These plates are connected by suitable resistors through the switch 150 to a voltage source which supplies a D.C. saturating voltage. The value of the voltage is selected so as to drive the condenser to a point of operation such as that shown at 6 in Figure 2. With the switch 150 in the position shown, the terminal 152 is connected to the source and biases to cut off the plate 105. The plate 103 is connected through the terminal 154 to ground. Thus, in this position, the output from the plate 103 is substantially larger than that from the plate 105. With the switch 150 in the opposite position, the output from plate 105 would be substantially larger than that of plate 103.

The second stage of the circuit makes use of the same dielectric sheet 100, and hence, the plates 103 and 105 are shown again in the stage 98. Each of these plates now acts like the input plate 101 and the plate 103 activates the output plates 107 and 109 and the input plate 105 activates the output plates 111 and 113. The switch 160 selects for cut off either the plates 107 and 111 or the plates 109 and 113. The third stage of the circuit 99 similarly selects one-half of the output resulting from the input plates 107, 109, 111 or 113. Consequently, one of the eight outputs is selected by any position of the three switches 150, 160 and 170. In the position shown, the switch 150 cuts off the plate 105 and only the plate 103 of the first stage produces an output. Likewise, the switch 160 cuts off plate 107 so that only plate 109 passes on the input signal to the third stage 99. The final switch 170 cuts off the plate 121, so that the selected output is that from the plate 119. The circuit of Figure 7 can be modified in the same ways as that of Figure 3 to produce a circuit like that shown in Figure 4 or a binary adder like that shown in Figure 5.

The capacitor circuit of Figure 7 lends itself to the convenient techniques of circuit printing. A single sheet of non-linear dielectric material, such as barium titanate, may be used and the various condenser plates printed in silver on the sheet, as shown in Figures 8 and 8*a*. Figure 8 shows the obverse of the condenser, and Figure 8*a* the reverse. The signal path through the dielectric is indicated by the arrows 97, 98 and 99 in Figure 7, and similarly in Figures 8 and 8*a*. A symbol ⊗ indicates a vector going into the plate of the drawing and a symbol ⊙ indicates a vector coming out of the plane of the drawing. The input plate 101 reaches the full height of the obverse surface of the dielectric sheet 100. Facing it on the reverse side are the plates 103 and 105 which extend along the width of the sheet to face respectively the plates 107 and 109, and 111 and 113 on the obverse side of the condenser. These four plates, inturn, are extended along the width of the sheet 100 to face on the reverse side the final output plates 115, 117, 119, 121, 123, 125, 127 and 129. Thus, if no D.C. saturating excitations were applied, the input signal applied to the plate 101 would pass in as shown by the vector 97 to the plates 103 and 105, and would continue out, as shown by the vector 98 to the plates 107, 109, 111 and 113, and would finally cross the dielectric sheet a third time to reach the output plates on the reverse side. In the circuit of Figure 7 and the printed capacitor of Figures 8 and 8*a* the "elements" which correspond to the saturable magnetic cores of Figure 3 are strips of dielectric widthwise along the sheet 100 of height equal to the height of the output plates 115, 117, etc. The structures corresponding to the control coils of Figure 3 are the connections through the switches 150, 160 and 170 which apply to the plates 103, 105, 107, 109, 111, 113, and the eight small output plates, saturating D.C. voltages.

It will therefore be understood that the invention is broad in scope, and is not to be construed as limited simply to the embodiments shown. The switches based on non-linear dielectric elements may be connected so as to make the embodiments of Figures 3, 4, and 5, and also other embodiments which may be useful in various applications. It should further be understood that, although the invention has been described in terms of a binary system, the control coils could be arranged in a ternary system, or in an arrangement based on any number A. $A^n$ outputs would be selected by *n* switches with A terminals, each terminal being connected to a control coil which cuts off one transmissive element. In such a case, $A^n$ transmissive elements would be required, except in the embodiment of Figure 6 where *n*A elements are sufficient to select one of $A^n$ output terminals.

Having thus described my invention, I claim:

1. Apparatus for controlling the transmission of electrical energy in a plurality of channels comprising saturable transformer means for each channel, input means for each saturable means, output means for each saturable means, a plurality of separate saturating means for the saturable means energization of any one of which biases all associated saturable means, an energy source supplying a uniform saturating excitation to the saturating means, and multistage switching means for selectively connecting the source to the saturating means.

2. Apparatus as described in claim 1 wherein the elements are magnetic cores and the input, output, and saturating means are coils surrounding the cores.

3. Apparatus for controlling the transmission of electrical energy in a plurality of channels comprising a plurality of saturable magnetic transformer cores, means for driving a plurality of cores simultaneously from a single source, saturating means and output means, one of which means comprises a set of windings in tree formation and the other of which comprises a set of individual windings, one for each core, a unidirectional energizing source for the saturating means, and selector switches to connect the source to the saturating means whereby transmission is blocked by each of the energized saturating windings and permitted only through those cores which have no energized saturating windings.

4. A multistage, multichannel transfer tree switch comprising at least one saturable magnetic transformer core for each channel, branches for each of said stages, input windings for each channel, output windings for each channel, energizing control means for applying a saturating voltage to each branch at each stage, and switching means for deenergizing one branch at each stage in order to permit transmission through any selected channel.

5. A multistage, multibranch selecting tree switch comprising a group of saturable magnetic cores, input windings for each core, saturating means for each core, a unidirectional energizing source for energizing said saturating means, and a matrix tree of output windings for the cores such that saturation of one of A$n$ cores blocks transmission through only one of $A^n$ outputs where A represents the number of branches per stage and $n$ represents the number of stages in the tree.

6. A multistage, multichannel selecting tree switch comprising at least one saturable magnetic transformer core for each channel, input windings for each core, output windings for each core, a matrix tree of saturating control windings energization of each of which will bias transmission through all the cores it controls, a unidirectional energizing source for energizing the saturating means, and switches for selectively individually disconnecting any one terminal at each control stage from the source to permit transmission through the channel which then carries no energized saturating windings.

7. A multistage, multichannel transfer tree switch comprising at least one saturable magnetic transformer core for each channel, input windings for each core, output windings for each core, a matrix tree of saturating control windings, energization of each of which biases transmission through all the cores it controls, said control windings being grouped into multiterminal stages wherein each stage includes at least one control winding capable of biasing each channel, a unidirectional energizing source for energizing the saturating means, and switches for selectively disconnecting any terminal at each control stage from the source to permit transmission through any channel which carries no energized saturating windings.

8. Apparatus for controlling the transmission of electrical energy in a plurality of channels comprising a single saturable transformer means for each channel, input means for each saturable means, output means for each saturable means, a plurality of separate saturating means for each saturable means energization of any one of which biases that transmitting means, an energy source supplying an unvarying saturating excitation to the saturating means, and multistage switching means for selectively connecting the source to the saturating means to bias transmission through all the saturable means associated with the energized saturating means.

9. A multichannel transfer tree switch comprising a single saturable transformer element for each channel, means for driving all saturable elements simultaneously, at least one output means for each saturable element, and a plurality of saturating maens for each element, said saturating means being arranged in groups corresponding to stages whereby each element has one saturating means from each stage, and each stage consists of a plurality of unique groups, a source of saturating unidirectional energization and switching means for energizing and deenergizing each group whereby all the elements in the energized groups will be saturated, but the element corresponding to a unique combination of unenergized groups will remain unsaturated.

10. Apparatus for controlling the transmission of electrical energy in a plurality of channels comprising saturable transformer means for each channel, means for driving said saturable means, and output leads and saturating leads for said saturable means at least one of which comprises a matrix of leads arranged in coordinate groupings wherein each lead connects with a unique combination of said saturable transformer means, a source of saturating unidirectional excitation which biases transmission through all saturable means to which it is applied by any saturating lead, and switching means to connect the saturating source to the saturable means whereby each combination of switch positions will bias transmission through a unique combination of channels.

11. Apparatus for controlling the transmission of electrical energy through a plurality of channels comprising a saturable magnetic transformer element for each channel, means for driving a plurality of said magnetic elements simultaneously, output means for each channel, saturating windings for each magnetic element, said saturating windings being arranged in groups wherein the saturating windings of each group simultaneously saturate all the magnetic elements with which they are associated, a unidirectional energizing source for the saturating windings, and switches for connecting the groups of saturating windings to the source in order to bias transmission through all magnetic elements associated with each group.

12. Apparatus for controlling the transmission of electrical energy through a plurality of channels comprising saturable transformer means for each channel, means for driving a plurality of said saturable means simultaneously, output means for each channel, a plurality of saturating means for each channel, said saturating means being arranged in main groups, said main groups being divided into sub-groups, each channel having a saturating device of each of several main groups, connecting means joining all of the saturating means of each sub-group to provide an equal saturating energization to all the saturable means controlled by the saturating means of that sub-group, a source of saturating unidirectional energy, and switching means to simultaneously energize selected sub-groups from a plurality of main groups to bias transmission through all channels identified with said sub-groups, whereby any selected channel identified by a unique combination of unenergized sub-groups will remain unsaturated.

13. Apparatus for controlling the transmission of alternating current energy through a plurality of channels comprising a single saturable transformer magneitc element for each channel, driving means for the element, a saturating unidirectional source, a plurality of saturating windings for each element, said saturating windings being arranged in main stages, each element having a saturating winding of each of the several main stages, said main stages being divided into sub-groups, connections to connect all of the saturating windings of each sug-group, whereby each element corresponds to a unique combination of sub-groups, switching means connecting each sub-group to the source to provide an equal saturating energization to all the elements in these sub-groups, and operating means to selectively disconnect one sub-group in each stage from the saturating source in order to permit transmission through the saturable element corresponding to the unique combination of deenergized sub-groups.

14. Apparatus for controlling the transmission of electrical energy in a plurality of channels comprising a saturable element for each channel, means for driving a plurality of the saturable elements simultaneously, a plurality of output means for each saturable element said output means being arranged in groups, and a plurality of saturating means for each element said saturating means being arranged in groups, a unidirectional saturating source, and switching means for connecting the source to all the saturating means of each separate group whereby all the saturable elements in the connected groups are biased and transmission takes place only through elements having no associated energized saturating means.

15. A magnetic switch comprising a plurality of magnetic elements, a plurality of pairs of coils of increasing order each consisting of a plurality of series connected windings, one of the lowest order pair of said coils being inductively coupled by windings to every alternate one of said elements, the other of said lowest order pair of coils being inductively coupled by windings to the remaining ones of said elements, one of the next higher order pair of said coils being inductively coupled to every alternate two of said elements, the other of said next higher order pair of said coils being inductively coupled to all of the remaining ones of said elements, each higher order pair of coils being inductively coupled in similar fashion to a number of alternately spaced magnetic elements which is twice the number of magnetic elements to which the immediately preceding lower pair of coils is coupled, one of the highest order pair of coils being inductively coupled to one half the total number of magnetic elements which are adjacent to one another, the other of said highest order coils being inductively coupled to the remaining one half of said elements, a single coil inductively coupled by a winding to every magnetic element, and means to selectively excite one of each of said pairs of coils and said single coil to drive a desired one of said elements to a desired magnetic condition.

16. A magnetic switch comprising a plurality of magnetic elements, a plurality of selecting coils inductively coupled to different ones of said elements in accordance with a desired binary code, and a plurality of output windings, each output winding being coupled to a different element.

17. A magnetic switch comprising a plurality of saturable magnetic cores, a plurality of pairs of selecting coils inductively coupled to different ones of said elements in accordance with a desired combinatorial code, means to excite selected ones of each of said pairs of coils simultaneously to change the magnetic state of only a selected core in accordance with said code, and a plurality of output coils, each individually coupled to a different core, the one of said output coils coupled to said selected core thereby responding to the said combined coil excitation.

18. A magnetic switch comprising a plurality of magnetic cores, a plurality of windings on each of said magnetic cores, said plurality of windings being divided into a set of input windings and a set of output windings, means connecting one winding on each core in said input sets of windings in series with one winding on the others of said cores in accordance with a first desired combinatorial code to form a plurality of input coils, means connecting one winding on each core in the output sets of windings in series with one winding on others of said cores in accordance with a second desired combinatorial code having a desired relation to said first code, and means to apply energization to said cores to cause a change in the magnetic condition of a desired one of said elements whereby a voltage is induced in the windings of said output set which are on said desired core.

19. A magnetic switch comprising a plurality of magnetic cores, a first plurality of coils, each of said first plurality of coils being inductively coupled to different ones of said magnetic cores in accordance with a first desired combinatorial code, a second plurality of coils, each of said second plurality of coils being inductively coupled to different ones of said magnetic cores in accordance with a second desired combinatorial code, a utilization device connected to each of the coils in said second set, and means to apply energization to said cores to cause a change in magnetic condition of a desired one of said cores whereby voltages are induced in each of the coils of said second plurality of coils which are coupled to said desired one of said cores and are applied to the utilization devices connected to said coils.

20. A magnetic switch comprising a plurality of magnetic elements, a plurality of selecting coils inductively coupled to different ones of said elements in accordance with a desired code, a plurality of output windings, each output winding being coupled to a different element, and means to excite simultaneously a plurality of said selecting coils in accordance with said code to drive a desired one of said elements to a desired magnetic condition.

21. A magnetic switch comprising a plurality of saturable magnetic cores, a plurality of selecting coils inductively coupled to different ones of said elements in accordance with a desired code, means to excite selected ones of said coils simultaneously to change the magnetic state of only a selected core in accordance with said code, and a plurality of output coils, each individually coupled to a different core, the one of said output coils coupled to said selected core thereby responding to the said combined coil excitation.

22. A magnetic switch according to claim 20 in which the selecting coils are arranged in groups, each group being inductively coupled to a plurality of elements, and each element being inductively coupled to a plurality of different groups of selecting coils according to said code.

References Cited in the file of this patent

UNITED STATES PATENTS

| | | |
|---|---|---|
| 1,547,964 | Semat | July 28, 1925 |
| 2,021,099 | FitzGerald | Nov. 12, 1935 |
| 2,570,716 | Rochester | Oct. 9, 1951 |
| 2,691,152 | Stuart-Williams | Oct. 5, 1954 |
| 2,722,565 | Ridler et al. | Nov. 1, 1955 |
| 2,733,860 | Rajchman | Feb. 7, 1956 |

OTHER REFERENCES

Publication, RCA Review, June 1952 (pp. 183–201).

Publication, Electrical Engineering, October 1952 (pp. 916–922).